United States Patent
Lyons

(10) Patent No.: US 11,439,231 B2
(45) Date of Patent: Sep. 13, 2022

(54) ROLLABLE TABLE ASSEMBLY

(71) Applicant: Brett Lyons, Parkersburg, WV (US)

(72) Inventor: Brett Lyons, Parkersburg, WV (US)

( * ) Notice: Subject to any disclaimer, the term of this patent is extended or adjusted under 35 U.S.C. 154(b) by 68 days.

(21) Appl. No.: 16/924,292

(22) Filed: Jul. 9, 2020

(65) Prior Publication Data
US 2022/0007833 A1    Jan. 13, 2022

(51) Int. Cl.
| | |
|---|---|
| *A47B 85/06* | (2006.01) |
| *A47B 3/08* | (2006.01) |
| *B62B 5/06* | (2006.01) |
| *B62B 3/02* | (2006.01) |

(52) U.S. Cl.
CPC ............. *A47B 85/06* (2013.01); *A47B 3/08* (2013.01); *B62B 3/02* (2013.01); *B62B 5/067* (2013.01); *A47B 2220/0077* (2013.01)

(58) Field of Classification Search
CPC ... A47B 85/06; A47B 3/08; A47B 2220/0077; B62B 3/02; B62B 3/04; B62B 5/067; B62B 2202/52; B62B 2206/06; B62B 1/12; B62B 1/20; B62B 2203/60; B62B 2206/006; B62B 5/0003
USPC .............. 108/11, 27, 23, 19, 18, 83, 85, 89, 108/129–133, 55.3, 55.5; 280/30, 639, 280/646, 651, 659
See application file for complete search history.

(56) References Cited

U.S. PATENT DOCUMENTS

| | | | | |
|---|---|---|---|---|
| 2,696,246 | A | * | 12/1954 | Putnam ................ B60N 2/2854 108/93 |
| 2,730,372 | A | * | 1/1956 | Mahr ........................ B62B 3/02 280/30 |
| 4,471,969 | A | * | 9/1984 | Zabala ..................... A47C 4/52 108/129 |
| 4,886,694 | A | * | 12/1989 | Donnard ............... B60P 7/0815 428/137 |
| 5,092,615 | A | | 3/1992 | Gregalis |
| 6,374,438 | B1 | * | 4/2002 | Fox ...................... A61G 7/0507 5/600 |
| 7,036,833 | B1 | * | 5/2006 | Berna ....................... B62B 3/04 280/166 |
| 7,513,511 | B2 | | 4/2009 | Chaseateau |
| 7,658,388 | B1 | * | 2/2010 | Rodriguez ............ B62B 5/0003 280/30 |
| 8,209,802 | B2 | * | 7/2012 | Linares .................. A61G 1/013 5/625 |
| 9,365,225 | B2 | | 6/2016 | Henao |
| 9,738,295 | B1 | * | 8/2017 | Horowitz ............. A47B 3/0818 |
| 2010/0032927 | A1 | | 2/2010 | Gordon |

(Continued)

FOREIGN PATENT DOCUMENTS

| | | | |
|---|---|---|---|
| CN | 204172004 | * | 2/2015 |
| CN | 108583642 | * | 9/2018 |

(Continued)

*Primary Examiner* — Janet M Wilkens

(57) ABSTRACT

A rollable table assembly for employing a table as a cart includes a table comprising a first half that is slidably coupled to a second half. A handle is slidably integrated into the table for gripping. A plurality of first wheels and a plurality of second wheels are each rotatably coupled to the table for rolling along the support surface. A plurality of light emitters is each coupled to the table. Each of the light emitters emits light when the light emitters are turned on to illuminate an area.

13 Claims, 8 Drawing Sheets

(56) References Cited

U.S. PATENT DOCUMENTS

| | | | | |
|---|---|---|---|---|
| 2013/0341878 A1* | 12/2013 | Harris | ............... | A47B 3/10 |
| | | | | 280/30 |
| 2015/0300627 A1* | 10/2015 | Wang | ............... | F21S 9/02 |
| | | | | 108/23 |
| 2016/0052534 A1* | 2/2016 | Henao | ............... | B62B 1/002 |
| | | | | 280/651 |

FOREIGN PATENT DOCUMENTS

| | | | |
|---|---|---|---|
| CN | 108639117 | * | 10/2018 |
| CN | 110015325 | * | 7/2019 |
| CN | 211642234 | * | 10/2020 |
| DE | 102012102427 | * | 9/2013 |
| EP | 3207824 | * | 8/2017 |
| JP | 3224070 | * | 11/2019 |
| KR | 20110032139 | * | 3/2011 |
| KR | 1486011 | * | 1/2015 |
| WO | 2007073734 | * | 7/2007 |
| WO | 2012177711 | * | 12/2012 |

\* cited by examiner

ROLLABLE TABLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to table devices and more particularly pertains to a new table device for employing a table as a cart.

(2) Description of Related Art Including Information Disclosed Under 37 CFR 1.97 and 1.98

The prior art relates to table devices. The prior art discloses a variety of tables that have wheels integrated therein for rolling the table in the convention of a cart. Moreover, none of the prior art discloses a cargo barrier in conjunction with wheels. The prior art does disclose table with wheels and cargo barriers, however the wheels are mounted on pivoting arms in this case. The assembly as disclosed in this application does not include pivoting arms on which wheels are mounted in conjunction with cargo barriers.

BRIEF SUMMARY OF THE INVENTION

An embodiment of the disclosure meets the needs presented above by generally comprising a table comprising a first half that is slidably coupled to a second half. A handle is slidably integrated into the table for gripping. A plurality of first wheels and a plurality of second wheels are each rotatably coupled to the table for rolling along the support surface. A plurality of light emitters is each coupled to the table. Each of the light emitters emits light when the light emitters are turned on to illuminate an area.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
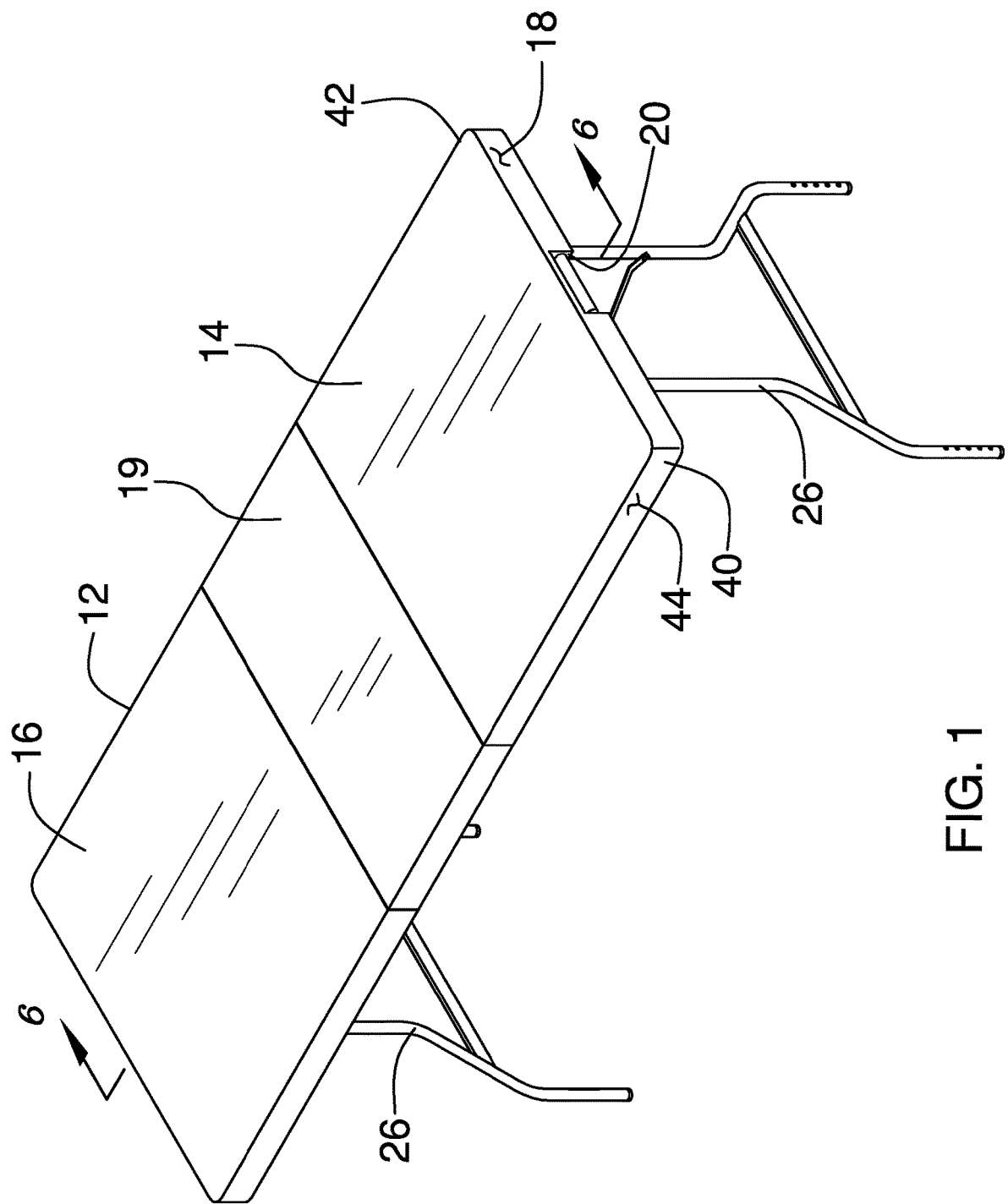
FIG. 1 is a top perspective view of a rollable table assembly according to an embodiment of the disclosure.
Figure 2:
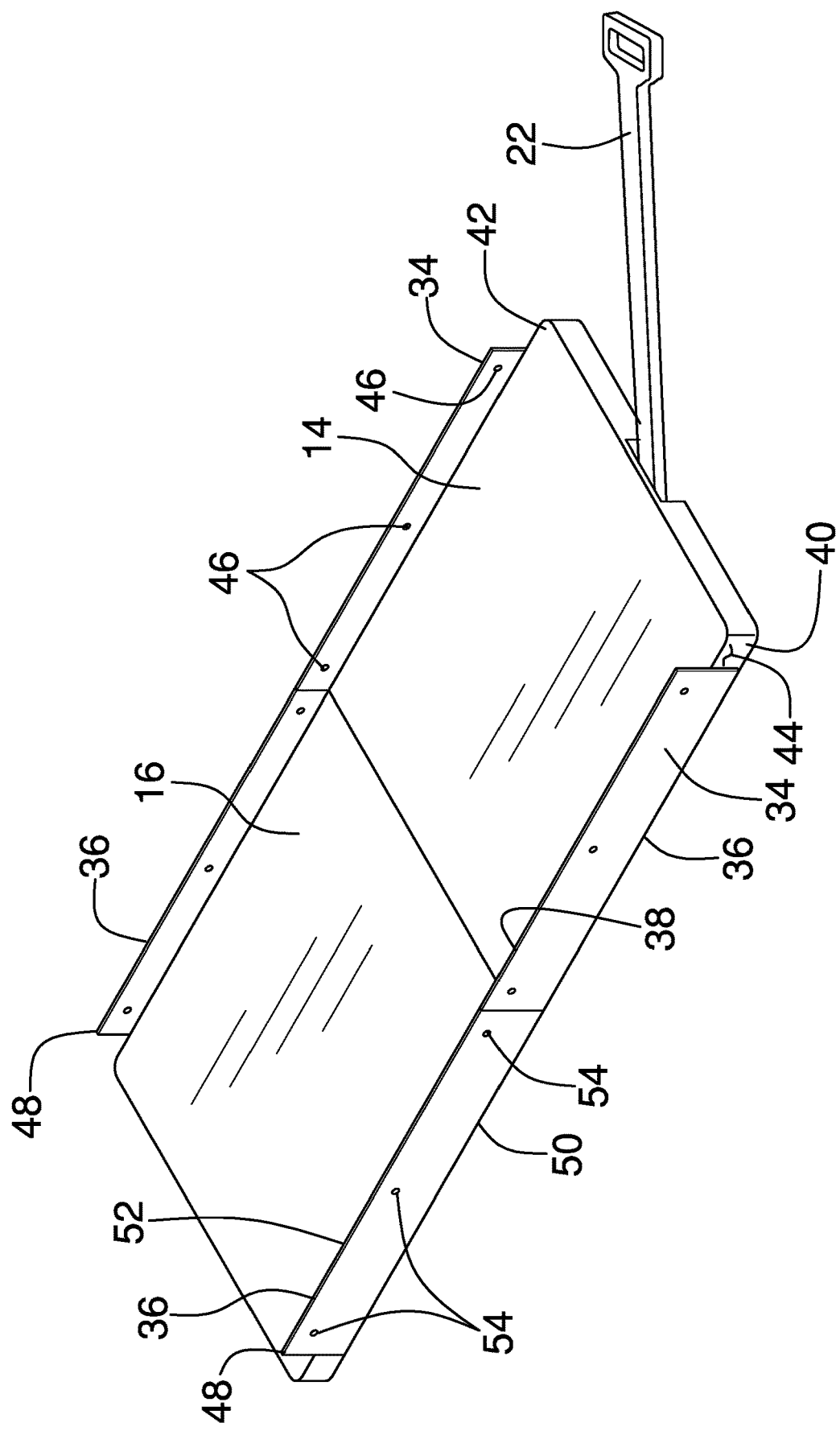
FIG. 2 is a top perspective view of an embodiment of the disclosure showing a plurality of legs being in a stored position.
Figure 3:
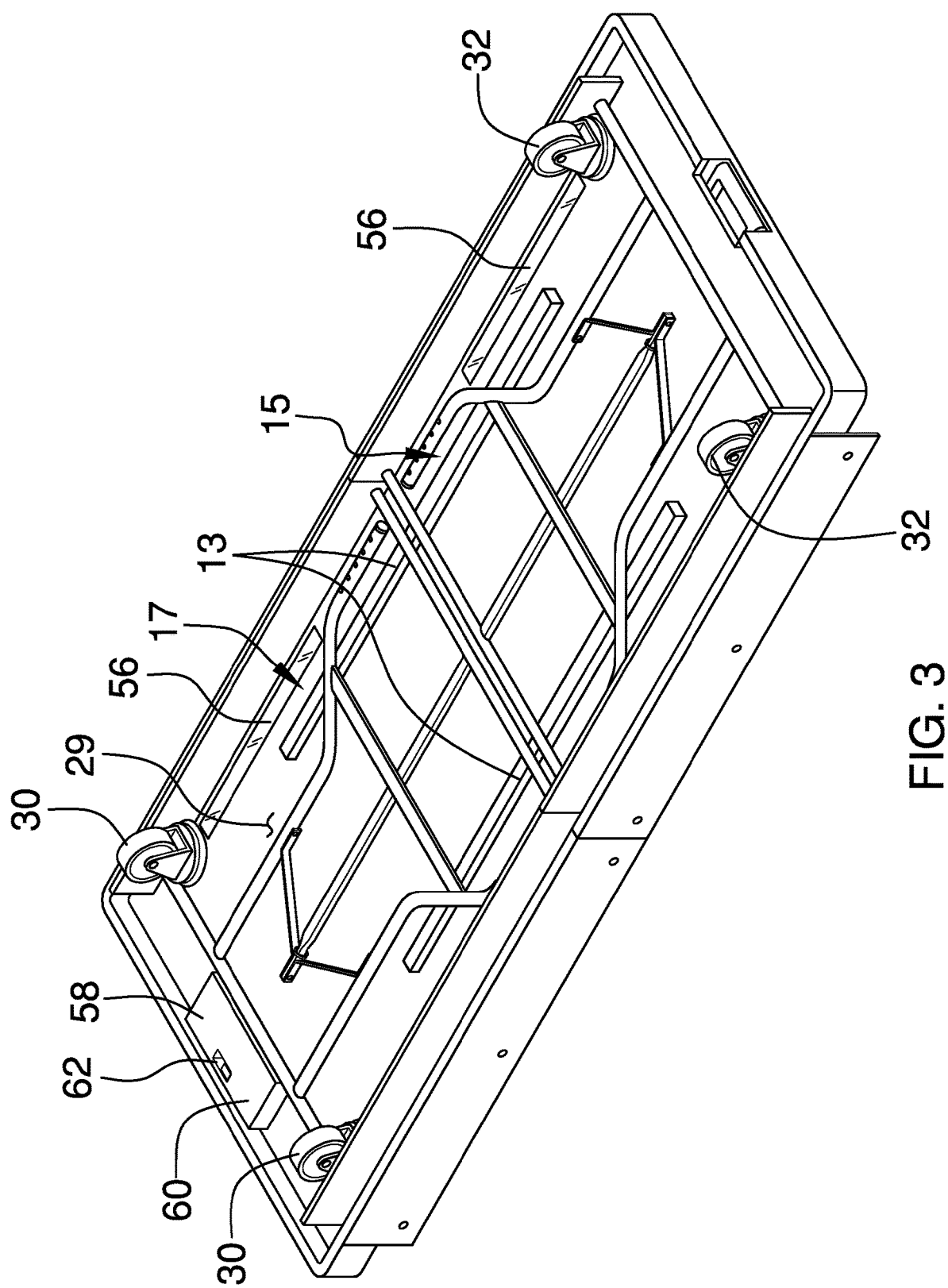
FIG. 3 is a bottom perspective view of an embodiment of the disclosure showing a plurality of legs being in a stored position.
Figure 4:
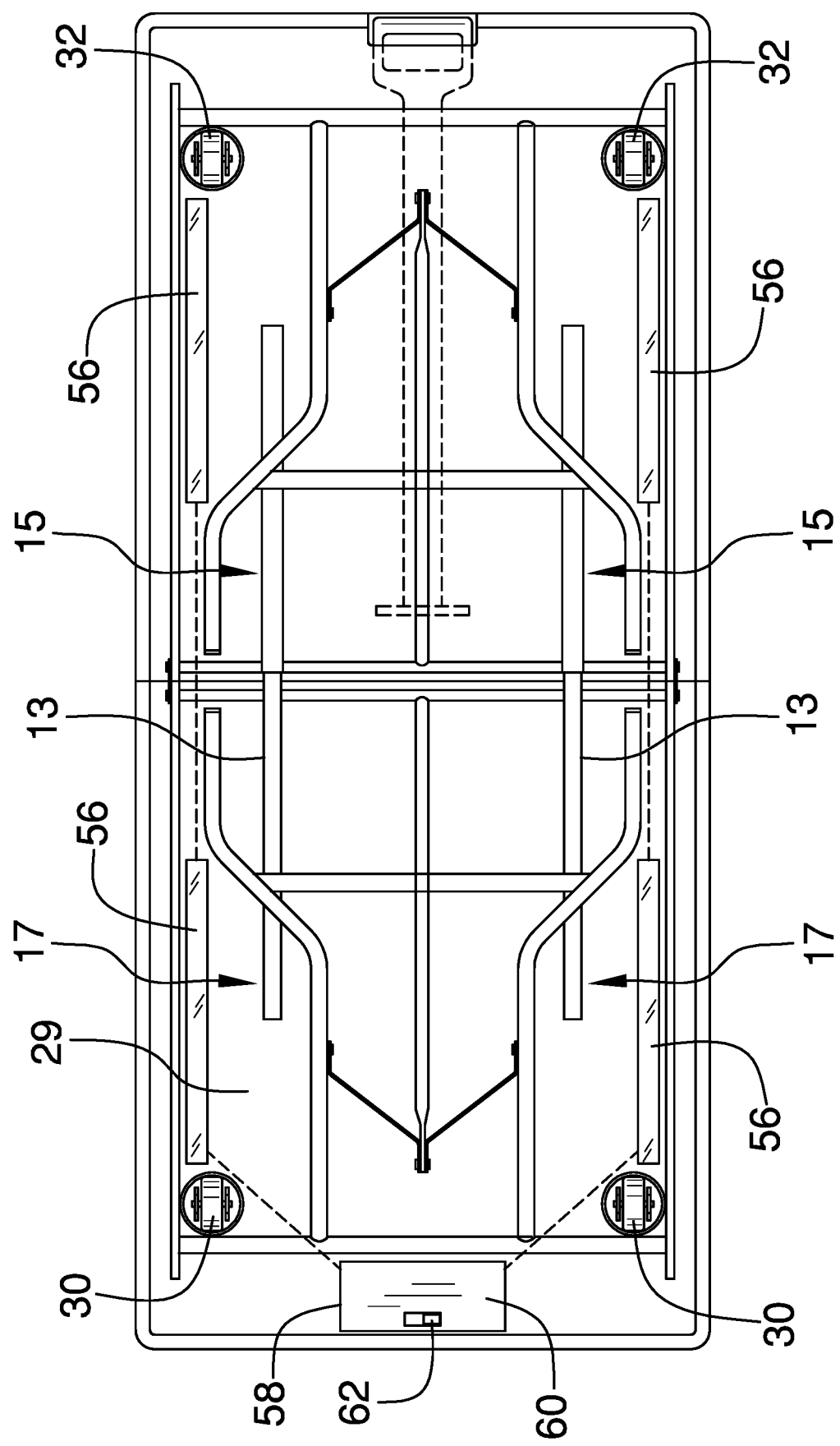
FIG. 4 is a bottom view of an embodiment of the disclosure showing a table in a folded position.
Figure 5:
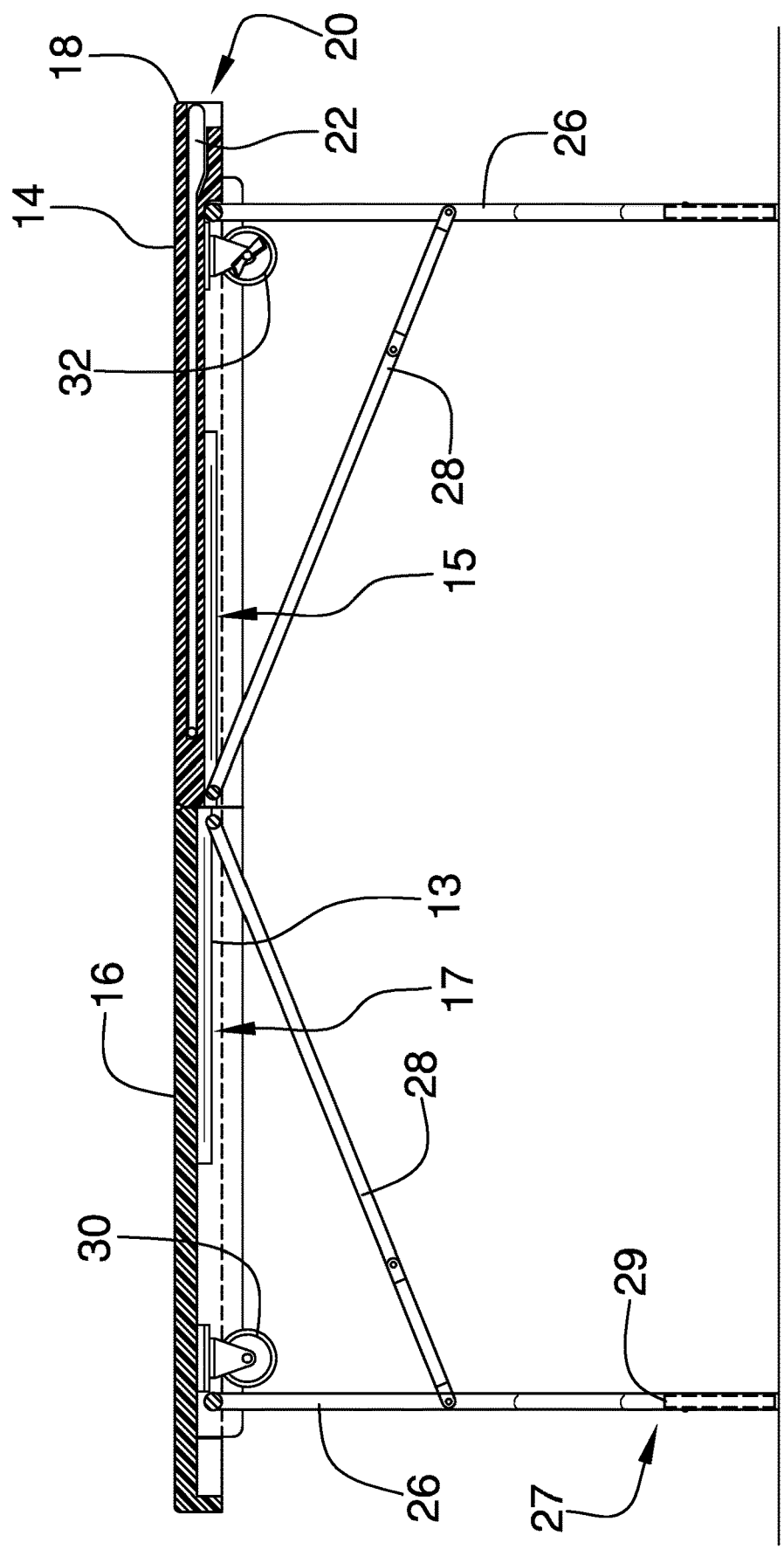
FIG. 5 is a cross sectional view taken along line 6-6 of FIG. 1 of an embodiment of the disclosure.
Figure 6:
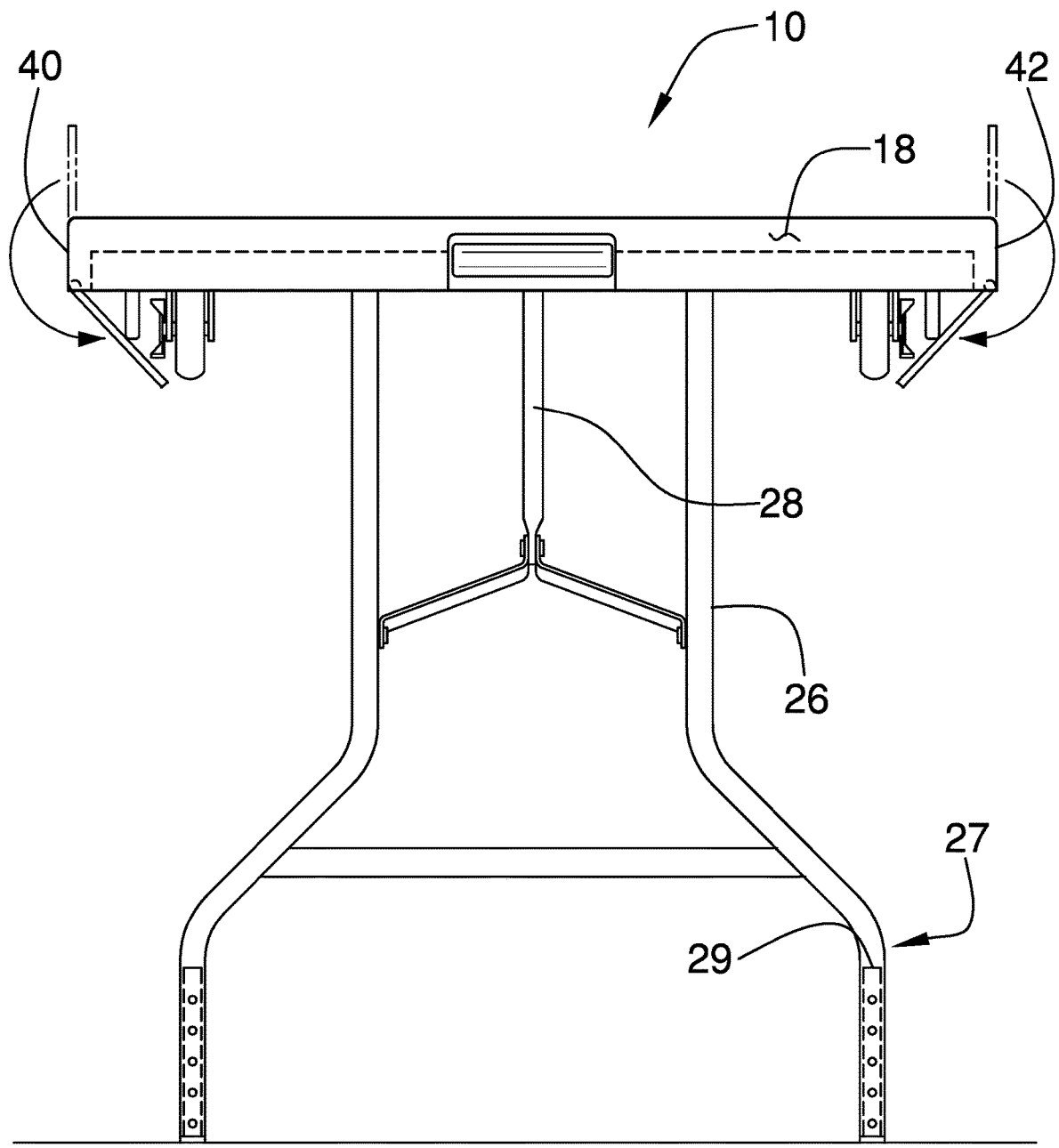
FIG. 6 is a front phantom view of an embodiment of the disclosure.
Figure 7:
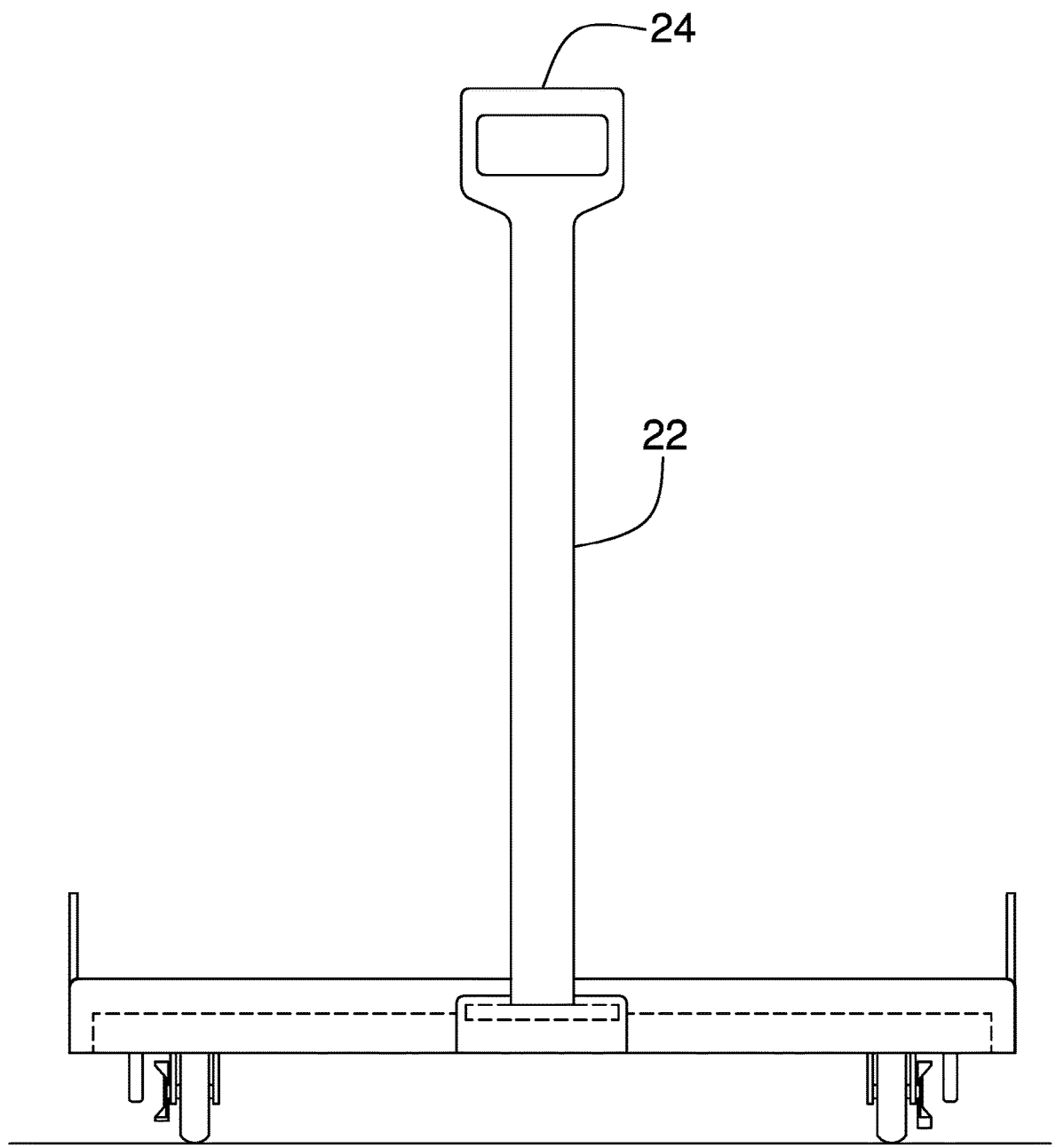
FIG. 7 is a front view of an embodiment of the disclosure showing legs in a stored position and showing a handle in an extended position.
Figure 8:
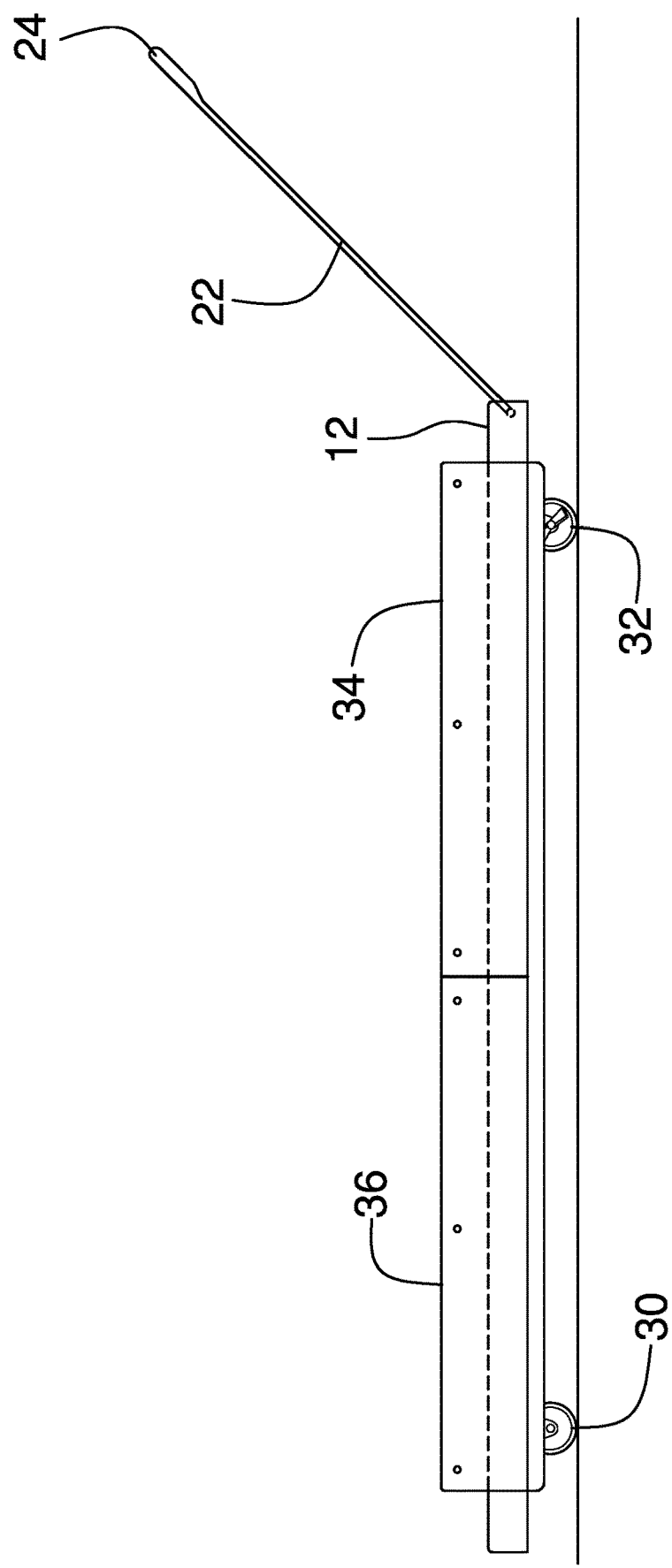
FIG. 8 is a perspective in-use view of an embodiment of the disclosure.

With reference now to the drawings, and in particular to FIGS. 1 through 8 thereof, a new table device embodying the principles and concepts of an embodiment of the disclosure and generally designated by the reference numeral 10 will be described.

As best illustrated in FIGS. 1 through 8, the rollable table assembly 10 generally comprises a table 12 that includes a first half 14 that is slidably coupled to a second half 16. The table 12 is positionable in a shortened position having the first half 14 abutting the second half 16. Additionally, the table 12 is positionable in an extended position having the first half 14 being spaced apart from the second half 16.

The table 12 has a bottom surface 13 and the first half 14 has a distal surface 18 with respect to the second half 16 and a channel 20 is integrated into the first half 14. The channel 20 extends through the distal surface 18 and toward the first half 14, and the channel 20 is centrally positioned on the first half 14. A handle 22 is provided and the handle 22 is slidably integrated into the table 12. The handle 22 is positionable in an extended position for gripping. Conversely, the handle 22 is positionable in a retracted position having the handle 22 being retracted into the table 12. The handle 22 is slidably positioned in the channel 20, the handle 22 has a grip 24 thereon and the grip 24 is exposed when the handle 22 is positioned in the extended position.

A plurality of rails 13 is each coupled to the first half 14 and the second half 16 of the table 12. Each of the rails 13 comprises a first portion 15 that slidably engages a second portion 17 thereby facilitating the first half 14 and the second half 16 to be slid between the shortened position and the extended position. Each of the rails 13 is positioned on the bottom surface 13 of each of the first half 14 and the second half 16. Additionally, the first portion 15 of each of the rails 13 is associated with the first half 14 and the second portion 17 of each of the rails 13 is associated with the second half 16. A leaf 19 is positionable between the first half 14 and the second half 16 when the table 12 is positioned in the extended position for extending the overall length of the table 12.

A plurality of legs 26 is provided and each of the legs 26 is pivotally coupled to the table 12. Each of the legs 26 is positionable in a deployed position for supporting the table 12 above a support surface 28. Additionally, each of the legs 26 is positionable in a stored position having the legs 26 lying against the table 12. Each of the legs 26 is positioned on a bottom surface 13 of the table 12 and each of the legs 26 is positioned on a respective one of the first half 14 or the second half 16. The legs 26 may be grouped into a pair of sets of legs 26 that is each positioned on a respective first half 14 and second half 16 of the table 12. Additionally, each set of legs 26 may include a locking mechanism 28 for retaining the legs 26 in the deployed position. Additionally, each of the legs 26 includes a first portion 27 that slidably engages a second portion 29 such that each of the legs 26 has a telescopically adjustable length.

A plurality of first wheels 30 is each rotatably coupled to the table 12 for rolling along the support surface 28 to transport the table 12. Each of the first wheels 30 is positioned on the bottom surface 13 of the table 12 and each of the first wheels 30 is positioned on the first half 14 of the table 12. Additionally, each of the first wheels 30 is non-pivotable and each of the first wheels 30 may comprise casters or other sufficiently load bearing wheel.

A plurality of second wheels 32 is each rotatably coupled to the table 12 for rolling along the support surface 28 for transporting the table 12. Each of the second wheels 32 is positioned on the bottom surface 13 of the table 12 and each of the second wheels 32 is positioned on the second half 16 of the table 12. Each of the second wheels 32 is pivotable about an axis oriented perpendicular to the bottom surface 29 for steering the table 12 along the support surface 28. The first wheels 30 and the second wheels 32 facilitate the table 12 to be employed in the convention of a cart when the table 12 is in deployed position and each of the legs 26 is in the folded position.

A plurality of first barriers 34 is provided and each of the first barriers 34 is hingedly coupled to the table 12. Each of the first barriers 34 is positionable in a deployed position having each of the first barriers 34 extending upwardly from the table 12. In this way each of the first barriers 34 inhibits objects from sliding off of the table 12 when the table 12 is rolled along the ground. Each of the first barriers 34 is positionable in a stored position has each of the first barriers 34 extending downwardly from the table 12.

Each of the first barriers 34 has a lower edge 36 and an upper edge 38, and the lower edge 36 of each of the first barriers 34 is hingedly coupled to a respective one of a first lateral side 40 and a second lateral side 42 of a perimeter surface 44 of the table 12. Each of the first barriers 34 is positioned on the first half 14 of the table 12. Each of the first barriers 34 has a plurality of apertures 46 extending therethrough to facilitate a cargo net, or other securing device, to be secured to the first barriers 34 for securing cargo on top of the table 12.

A plurality of second barriers 48 is provided and each of the second barriers 48 is hingedly coupled to the table 12. Each of the second barriers 48 is positionable in a deployed position having each of the second barriers 48 extending upwardly from the table 12. In this way each of the second barriers 48 inhibits objects from sliding off of the table 12 when the table 12 is rolled along the ground. Each of the second barriers 48 is positionable in a stored position having each of the second barriers 48 extending downwardly from the table 12.

Each of the second barriers 48 has a lower edge 50 and an upper edge 52, and the lower edge 50 of each of the second barriers 48 is hingedly coupled to a respective one of the first lateral side 40 and the second lateral side 42 of the perimeter surface 44 of the table 12. Each of the second barriers 48 is positioned on the second half 16 of the table 12. Each of the second barriers 48 has a plurality of apertures 54 extending therethrough to facilitate a cargo net, or other securing device, to be secured to the second barriers 48 for securing cargo on top of the table 12. Each of the first barriers 34 and the second barriers 48 has a bend extending along a parallel line with respect to said lower edge 50 and said upper edge 52.

A plurality of light emitters 56 is provided and each of the light emitters 56 is coupled to the table 12. Each of the light emitters 56 emits light when the light emitters 56 are turned on to illuminate an area. Each of the light emitters 56 is positioned on the bottom surface 29 of the table 12 and the light emitters 56 are distributed evenly on the first half 14 and the second half 16 of the table 12. Moreover, each of the light emitters 56 is elongated and each of the light emitters 56 may comprise an LED strip or the like.

A power supply 58 is coupled to the table 12 and the power supply 58 is electrically coupled to each of the light emitters 56. The power supply 58 turns on each of the light emitters 56 when the power supply 58 is turned on. The power supply 58 comprises at least one battery 60 is positioned on the bottom surface 29 of the table 12. The at least one battery 60 is positioned adjacent to the perimeter surface 44 of the table 12 such that the at least one battery 60 is accessible to a user. Additionally, the at least one battery 60 is electrically coupled to each of the light emitters 56.

A power switch 62 is slidably positioned on the at least one battery 60 and the power switch 62 is electrically coupled to the at least one battery 60. The power switch 62 closes a circuit to supply voltage to the light emitters 56 when the power switch 62 is turned on. Conversely, the power switch 62 opens the circuit to inhibit voltage being supplied to the light emitters 56 when the power switch 62 it turned off.

In use, the table 12 is positioned in either the shortened position or the extended position and the table 12 is laid on the first wheels 30 and the second wheels 32. The handle 22 is positioned in the extended position and the handle 22 is gripped to roll the table 12 along the support surface 28. Additionally, objects can be positioned on top of the table 12 thereby facilitating the table 12 to act as a cart. Each of the legs 26 is positioned in the deployed position to employ the table 12 in the conventional manner of tables. Thus, the table 12 serves the dual purpose of a cart and a table.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rollable table assembly being configured to be positionable in a cart orientation for transportation and a table orientation, said assembly comprising:
 a table comprising a first half being slidably coupled to a second half, said table being positionable in a shortened position having said first half abutting said second half, said table being positionable in an extended position having said first half being spaced from said second half;
 a handle being slidably integrated into said table, said handle being positionable in an extended position wherein said handle is configured to be gripped, said handle being positionable in a retracted position having said handle being retracted into said table;
 a plurality of legs, each of said legs being pivotally coupled to said table, each of said legs being positionable in a deployed position for supporting said table above a support surface, each of said legs being positionable in a stored position having said legs lying against said table;
 a plurality of first wheels, each of said first wheels being rotatably coupled to said table wherein each of said first wheels is configured to roll along the support surface for transporting said table;
 a plurality of second wheels, each of said second wheels being rotatably coupled to said table wherein each of said second wheels is configured to roll along the support surface for transporting said table;
 a plurality of light emitters, each of said light emitters being coupled to said table, each of said light emitters emitting light when said light emitters are turned on wherein said light emitters are configured to illuminate an area; and
 wherein each of said first half and said second half has a bottom surface, said first half having a distal surface with respect to said second half, said first half having a channel being integrated therein, said channel extending through said distal surface and toward said second half, said channel being centrally positioned on said first half.

2. The assembly according to claim 1, wherein said handle is slidably positioned in said channel, said handle having a grip thereon, said grip being exposed when said handle is positioned in said extended position.

3. The assembly according to claim 1, wherein each of said first wheels is positioned on said bottom surface of said table, each of said first wheels being positioned on said first half of said table, each of said first wheels being non-pivotable.

4. The assembly according to claim 1, wherein each of said second wheels is positioned on said bottom surface of said table, each of said second wheels being positioned on said second half of said table, each of said second wheels being pivotable about an axis oriented perpendicular to said bottom surface for steering said table along the support surface.

5. The assembly according to claim 1, wherein each of said light emitters being positioned on said bottom surface of said table, said light emitters being distributed evenly on said first half and said second half of said table, each of said light emitters being elongated.

6. The assembly according to claim 5, further comprising a power supply being coupled to said table, said power supply being electrically coupled to each of said light emitters, said power supply turning on each of said light emitters when said power supply is turned on.

7. The assembly according to claim 6, wherein said power supply comprises at least one battery being positioned on said bottom surface of said table, said at least one battery being positioned adjacent to said perimeter surface of said table wherein said at least one battery is configured to be accessible to a user, said at least one battery being electrically coupled to each of said light emitters.

8. The assembly according to claim 7, further comprising a power switch being slidably positioned on said at least one battery, said power switch being electrically coupled to said at least one battery, said power switch closing a circuit to supply voltage to said light emitters when said power switch is turned on, said power switch opening said circuit to inhibit voltage being supplied to said light emitters when said power switch it turned off.

9. The assembly according to claim 1, further comprising:
 a plurality of rails each of said rails being coupled to said first half and said second half of said table, each of said rails comprising a first portion that slidably engages a second portion thereby facilitating said first half and said second half to be slid between said shortened position and said extended position, each of said rails being positioned on said bottom surface of each of said first half and said second half, said first portion of each of said rails being associated with said first half, said second portion of each of said rails being associated with said second half;
 a leaf being positionable between said first half and said second half when said table is positioned in said extended position for extending the overall length of said table;
 said handle being slidably positioned in said channel, said handle having a grip thereon, said grip being exposed when said handle is positioned in said extended position,
 each of said legs being positioned on a bottom surface of said table, each of said legs being positioned on a respective one of said first half or said second half;
 each of said first wheels being positioned on said bottom surface of said table, each of said first Wheels being positioned on said first half of said table, each of said first wheels being non-pivotable;
 each of said second wheels being positioned on said bottom surface of said table, each of said second wheels being positioned on said second half of said table, each of said second wheels being pivotable about an axis oriented perpendicular to said bottom surface for steering said table along the support surface;
 a plurality of first barriers, each of said first barriers being hingedly coupled to said table, each of said first barriers being positionable in a deployed position having each of said first barriers extending upwardly from said table wherein each of said first barriers is configured to inhibit objects from sliding off of said table when said table is rolled along the ground, each of said first barriers being positionable in a stored position having each of said first barriers extending downwardly from said table, each of said first barriers having a lower edge and an upper edge, said lower edge of each of said first barriers being hingedly coupled to a respective one of a first lateral side and a second lateral side of a perimeter surface of said table, each of said first barriers being positioned on said first half of said table, each of said first barriers having a plurality of apertures extending therethrough to facilitate a cargo net to be secured to said first barriers for securing cargo on top of said table;

a plurality of second barriers, each of said second barriers being hingedly coupled to said table, each of said second barriers being positionable in a deployed position having each of said second barriers extending upwardly from said table wherein each of said second barriers is configured to inhibit objects from sliding off of said table when said table is rolled along the ground, each of said second barriers being positionable in a stored position having each of said second barriers extending downwardly from said table, each of said second barriers having a lower edge and an upper edge, said lower edge of each of said second barriers being hingedly coupled to a respective one of a first lateral side and a second lateral side of a perimeter surface of said table, each of said second barriers being positioned on said second half of said table, each of said second barriers having a plurality of apertures extending therethrough to facilitate a cargo net to be secured to said second barriers far securing cargo on top of said table;

each of said light emitters being positioned on said bottom surface of said table, said light emitters being distributed evenly on said first half and said second half of said table, each of said light emitters being elongated; and a power supply being coupled to said table, said power supply being electrically coupled to each of said light emitters, said power supply turning on each of said light emitters when said power supply is turned on, said power supply comprising:
  at least one battery being positioned on said bottom surface of said table, said at least one battery being positioned adjacent to said perimeter surface of said table wherein said at least one battery is configured to be accessible to a user, said at least one battery being electrically coupled to each of said light emitters; and
  a power switch being slidably positioned on said at least one battery, said power switch being electrically coupled to said at least one battery, said power switch closing a circuit to supply voltage to said light emitters when said power switch is turned on, said power switch opening said circuit to inhibit voltage being supplied to said light emitters when said power switch it turned off.

10. A rollable table assembly being configured to be positionable in a cart orientation for transportation and a table orientation, said assembly comprising:
  a table comprising a first half being slidably coupled to a second half, said table being positionable in a shortened position having said first half abutting said second half, said table being positionable in an extended position having said first half being spaced from said second half;
  a handle being slidably integrated into said table, said handle being positionable in an extended position wherein said handle is configured to be gripped, said handle being positionable in a retracted position having said handle being retracted into said table;
  a plurality of legs, each of said legs being pivotally coupled to said table, each of said legs being positionable in a deployed position for supporting said table above a support surface, each of said legs being positionable in a stored position having said legs lying against said table;
  a plurality of first wheels, each of said first wheels being rotatably coupled to said table wherein each of said first wheels is configured to roll along the support surface for transporting said table;
  a plurality of second wheels, each of said second wheels being rotatably coupled to said table wherein each of said second wheels is configured to roll along the support surface for transporting said table;
  a plurality of light emitters, each of said light emitters being coupled to said table, each of said light emitters emitting light when said light emitters are turned on wherein said light emitters are configured to illuminate an area; and
  a plurality of first barriers, each of said first barriers being hingedly coupled to said table, each of said first barriers being positionable in a deployed position having each of said first barriers extending upwardly from said table wherein each of said first barriers is configured to inhibit objects from sliding off of said table when said table is rolled along the ground, each of said first barriers being positionable in a stored position having each of said first barriers extending downwardly from said table.

11. The assembly according to claim 10, wherein each of said first barriers has a lower edge and an upper edge, said lower edge of each of said first barriers being hingedly coupled to a respective one of a first lateral side and a second lateral side of a perimeter surface of said table, each of said first barriers being positioned on said first half of said table, each of said first barriers having a plurality of apertures extending therethrough to facilitate a cargo net to be secured to said first barriers for securing cargo on top of said table.

12. A rollable table assembly being configured to be positionable in a cart orientation for transportation and a table orientation, said assembly comprising:
  a table comprising a first half being slidably coupled to a second half, said table being positionable in a shortened position having said first half abutting said second half, said table being positionable in an extended position having said first half being paced from said second half;
  a handle being slidably integrated into said table, said handle being positionable in an extended position wherein said handle is configured to be gripped, said handle being positionable in a retracted position having said handle being retracted into said table;
  a plurality of legs, each of said legs being pivotally coupled to said table, each of said legs being positionable in a deployed position for supporting said table above a support surface, each of said legs being positionable in a stored position having said legs lying against said table;

a plurality of first wheels, each of said first wheels being rotatably coupled to said table wherein each of said first wheels is configured to roll along the support surface for transporting said table;

a plurality of second wheels, each of said second wheels being rotatably coupled to said table wherein each of said second wheels is configured to roll along the support surface for transporting said table;

a plurality of light emitters, each of said light emitters being coupled to said table, each of said light emitters emitting light when said light emitters are turned on wherein said light emitters are configured to illuminate an area;

a plurality of first barriers; and a plurality of second harriers, each of said second barriers being hingedly coupled to said table, each of said second harriers being positionable in a deployed position having each of said second barriers extending upwardly from said table wherein each of said second barriers is configured to inhibit objects from sliding off of said table when said table is rolled along the ground, each of said second barriers being positionable in a stored position having each of said second barriers extending downwardly from said table.

13. The assembly according to claim 12, wherein each of said second barriers has a lower edge and an upper edge, said lower edge of each of said second barriers being hingedly coupled to a respective one of a first lateral side and a second lateral side of a perimeter surface of said table, each of said second barriers being positioned on said second half of said table, each of said second barriers has a plurality of apertures extending therethrough to facilitate a cargo net to be secured to said second barriers for securing cargo on top of said table.

* * * * *